June 20, 1961 D. C. KALBFELL 2,989,648
MAGNETIC NULL DETECTING SYSTEM
Filed July 1, 1957
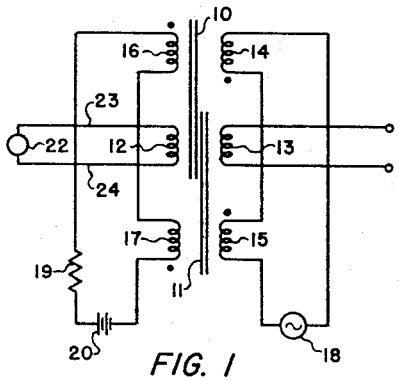
FIG. 1
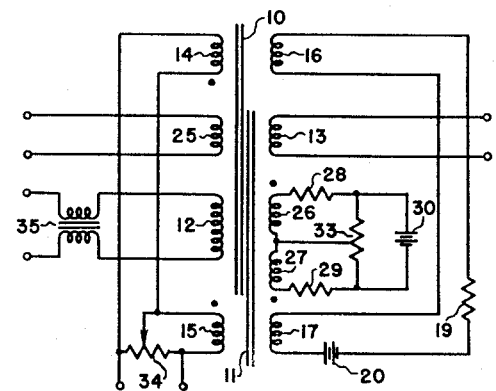
FIG. 3
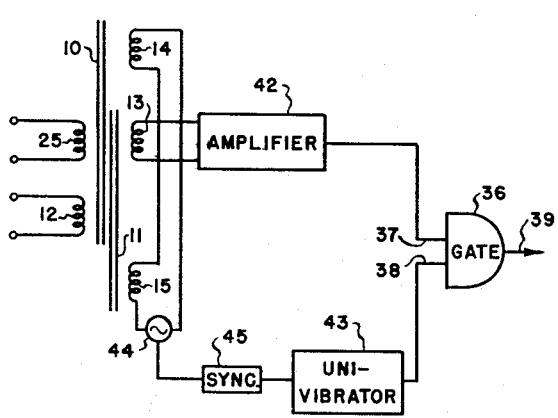
FIG. 4
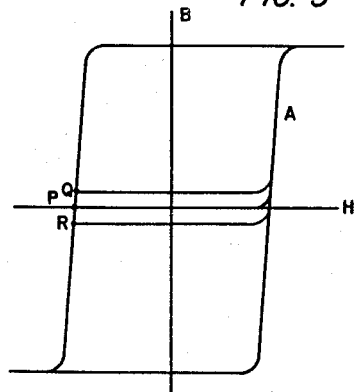
FIG. 2
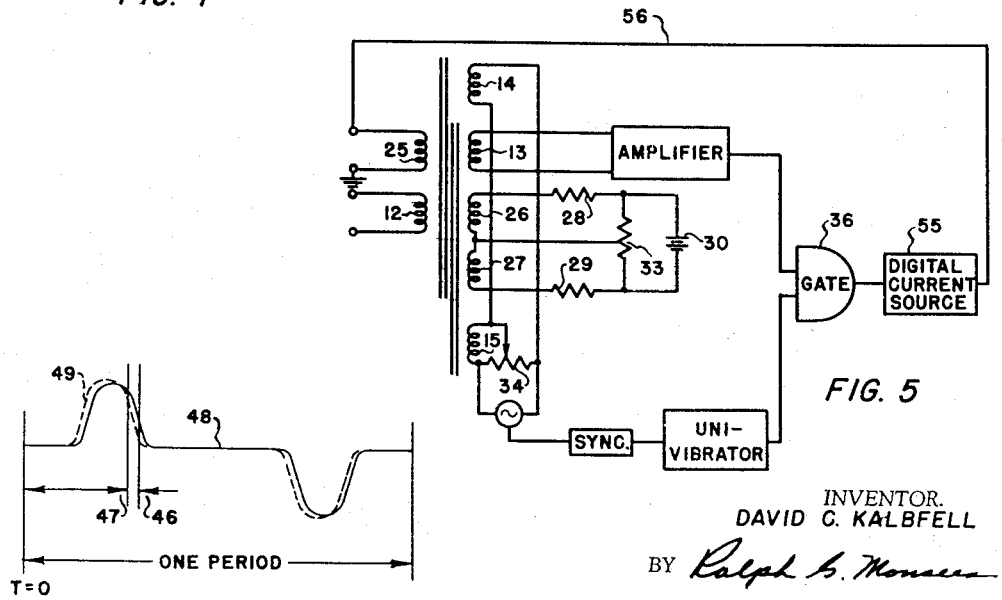
FIG. 5
FIG. 6
INVENTOR.
DAVID C. KALBFELL
BY Ralph G. Monsen
ATTORNEY United States Patent Office 2,989,648
Patented June 20, 1961

2,989,648
MAGNETIC NULL DETECTING SYSTEM
David C. Kalbfell, 941 Rosecrans St., San Diego 6, Calif.
Filed July 1, 1957, Ser. No. 669,336
16 Claims. (Cl. 307—88)

This invention relates generally to a magnetic null detecting system and more particularly to a magnetic null detecting system which will indicate when a single signal goes through zero or can compare extremely small differences in the magnitude of two signals and produce an output whose polarity is determined by the algebraic sum of the two signals.

Null detecting systems find considerable application in measuring and testing equipment, data handling systems, and automatic control equipment. Electronic null detectors, or null comparators, are used in many applications of the aforementioned systems. However, these null detectors have certain disadvantages. For example, the electronic systems are quite susceptible to the severe environmental conditions, such as shock and vibration experienced in most airborne applications, and furthermore are bulky and relatively short lived.

The magnetic null detector of the present invention is much less expensive to construct and maintain than the electronic null detectors. It is capable of precision operation at substantially the same null levels, yet has the additional advantages of size, weight, long life, reliability and ruggedness over comparable electronic systems.

It is therefore an object of the present invention to provide magnetic apparatus of unusually high sensitivity serving as a null detector, or comparator, to indicate the polarity of a single signal or to compare extremely small differences in the magnitudes of a pair of signals and produce an output voltage whose polarity is dependent upon which of the two signals is larger.

Another object of the present invention is to provide a high speed, extremely sensitive null detector utilizing a magnetic amplifying device to indicate when a single input signal goes through zero or to compare the current from an unknown source with a known current applied to the magnetic device.

Another object is to develop a magnetic null detector capable of operating reliably down to much lower signal levels than heretofore realized.

Another object of this invention is to develop a magnetic null detecting system having high sensitivity at the null condition to compare an input current with the current generated by a digital current source.

Another object of this invention is to provide means for compensating for the difference between individual magnetic cores or for imperfections in the cores of a magnetic device which utilizes a plurality of cores.

Another object of this invention is to provide a magnetic null detector in when the unbalanced components in the output signal are rejected except during a small portion of the total period, during which the necessary information is produced.

Another object of the present invention is to provide an improved magnetic null detector which utilizes a pair of cores compensated to produce similar electromotive forces over one portion of the cycle and means for selecting this portion of the cycle to control a digital feedback signal in a manner to match the input signal accurately and thereby produce an indication of the magnitude of the input signal.

Other objects and features of the present invention will be readily apparent to those skilled in the art from the following specification and appended drawings wherein is illustrated a preferred form of the invention and in which:

FIGURE 1 is a circuit diagram showing a magnetic circuit which serves to indicate when the input signal goes from positive to negative or vice versa.

FIGURE 2 is an idealized B—H curve which will aid in understanding the operation of the circuit illustrated in FIGURE 1.

FIGURE 3 is a circuit diagram illustrating a magnetic null detector for indicating the relative magnitude of two signals with means for compensating for differences or imperfections in the cores.

FIGURE 4 is a circuit diagram illustrating a magnetic null detector with means for selecting a predetermined portion of the output signal and rejecting the undesired components.

FIGURE 5 is a combined schematic and block diagram of a magnetic null detector which utilizes a pair of cores compensated to produce similar electromotive forces over a portion of the output cycle and gating means for selecting that portion of the cycle to control a digital current source that supplies current to the feedback winding of the magnetic circuit.

FIGURE 6 is a graphical representation illustrating the effects of balancing the magnetic cores over a selected portion of the cycle.

Although the magnetic circuit illustrated in FIGURE 1 does produce appreciable amplification, it serves primarily as a zero or polarity detector rather than as an amplifier of large dynamic range. It intentionally differs from conventional magnetic ampifiers in which it is desirable to realize a more or less linear relationship between output power and the controlling input signal over a substantial range of input signal magnitudes. The primary feature of the magnetic zero detector illustrated in FIGURE 1 is its high sensitivity in the vicinity of the zero or null condition. In conventional magnetic amplifiers the mean power of the carrier current is controlled, however, in the magnetic circuit of the present invention, control of mean carrier power is not important. The carrier in the present invention may be considered as being used only for purposes of interrogation, that is to ascertain the state of the two magnetic cores. As a matter of fact, the carrier signal need not even be a continuous frequency, but may be merely a series of pulses. It should be understood, however, that even though the magnetic zero or null detection system described herein provides extremely sensitive and rapid zero detection, it has been found that the circuit produces appreciable amplification as well.

As shown in FIGURE 1, this magnetic zero detector includes a pair of magnetic cores 10 and 11 which may be toroidal in form and constructed of a magnetic material having high maximum differential permeability in the form of thin tape for high frequency applications. The circuit also includes input and output windings 12 and 13, which are each carried by both of the cores 10 and 11, a pair of carrier windings 14 and 15 carried separately by the cores 10 and 11, respectively, and a pair of bias windings 16 and 17 also carried separately by the cores 10 and 11, respectively. Carrier windings 14 and 15 are connected in series across a source of carrier current 18, which may be a generator for producing a sine wave, sawtooth wave or a pulse wave output. Bias windings 16 and 17 are connected in series and through a resistor 19 across a source of unidirectional current 20, and serve to magnetically bias the cores 10 and 11. It will be understood that the bias windings are optional and may be omitted if the carrier current 18 contains an equivalent unidirectional component.

Operation of the circuit illustrated in FIGURE 1 is best understood by referring to the B—H curve shown in FIGURE 2. Assuming that the magnetic cores are initially established at the point P and a carrier signal from source 18 is applied to the windings 14 and 15 on cores 10 and 11, respectively, which will cause the point P to move to the right. Two E.M.F.'s will be induced in the output winding 13, which is common to both cores, one E.M.F. is the result of carrier current flowing in winding 14 and the other is the result of carrier current flowing in winding 15. The E.M.F.'s will be proportional to the slope of the path traversed from the point P and will be substantially narrow pulses occurring near the point A. As indicated in FIGURE 1, carrier windings 14 and 15 are oriented such that the magnetic fluxes due to the currents flowing in the windings are opposite in direction. Hence, the two E.M.F.'s tend to cancel each other in the output winding 13. In the event the two E.M.F.'s developed in winding 13 are exactly equal, they would completely cancel each other and the net output would be zero. However, when the two E.M.F's are not equal in magnitude and phase, the net output induced in output winding 13 indicates which of the two cores is generating the larger E.M.F. at that particular time. Unidirectional bias current supplied by the source 20 and regulated by the resistor 19 flows through the windings 16 and 17 and serves to establish the initial operating point in the vicinity of the point P. However, as mentioned hereinbefore, this may be eliminated where the carrier supply contains the equivalent unidirectional component.

Now suppose that each of the cores 10 and 11 has a small additional unidirectional current which produces opposite effects in the two cores so that, instead of both cores starting from the same point, one core starts from the point Q while the other starts from the point R. Now when the carrier current is applied, that core which started at the point Q will produce an E.M.F. which occurs later in time and has a slightly smaller magnitude than if it started from the point P. The magnetic core which starts from the point R will have its maximum output at an earlier time and it will have a slightly larger magnitude. When these two E.M.F.'s are subtracted, as described hereinbefore, there will be a small differential voltage, which will appear across the output winding 13. The polarity of this differential voltage, generated in the vicinity of point A, will depend upon the polarity of the small additional unidirectional current applied to the cores 10 and 11. Furthermore, if the polarity of the unidirectional current changes, the polarity of the voltage appearing across the output winding will also change.

The additional unidirectional current mentioned hereinabove is supplied by an input signal source 22 and applied to input winding 12 via leads 23 and 24. Hence, the polarity of the voltage developed across the output winding 13 will correspond to the polarity of the input current and when the polarity of the input current changes the output voltage will also change.

In connection with the description and operation of the magnetic circuit illustrated in FIGURE 1, it should be understood that the particular location of the point P mentioned in relation to FIGURE 2 was used for purposes of illustration only. The circuit will operate satisfactorily for any initial value of H in the left half of the plane.

Referring now to FIGURE 3 wherein like reference numerals refer to like parts through the several figures, this FIGURE 3 is a circuit diagram illustrating a magnetic null detector for indicating the relative magnitude of two signals with means for compensating for differences or imperfections in the magnetic cores. As shown, the circuit includes the pair of magnetic cores 10 and 11, a pair of input and reference or feedback windings 12 and 25 respectively and output winding 13, which are all carried by both of the cores 10 and 11, the pair of carrier windings 14 and 15 carried separately by the cores 10 and 11, respectively, and by a pair of balancing windings 26 and 27, which are wound in opposition on the cores 10 and 11 as indicated by the conventional dots on the drawings and the pair of bias windings 16 and 17 where required. Balancing windings 26 and 27 have one terminal interconnected and the other terminal of each is connected through resistors 28 and 29 across a source of unidirectional potential 30. Connected across the source 30 and in parallel with windings 26 and 27 is a balancing potentiometer 33, the variable tap of which is connected to the common terminal junction of windings 26 and 27.

The direct current balancing means described hereinabove serves to adjust the phase of the electromotive forces generated by the cores 10 and 11 by applying a unidirectional signal to the cores 10 and 11 which aids the flux in one carrier winding while opposing the flux resulting from the other carrier winding. The circuitry described above and illustrated by the drawings may be used to produce an effect of either polarity. For example, when the variable arm of potentiometer 33 is exactly in the center, the net balancing flux is zero since the number of turns on the balancing windings 26 and 27 is the same with the same amount of current flowing through both the windings. However, if the variable tap is moved from this position the amount of current through either winding may be controlled, thereby providing means for controlling the magnitude and direction of the balancing flux in the cores. It has been found that this balance control produces a phase displacement between the E.M.F.'s generated by the two cores, and in terms of the ordinary graph of the B—H curve, such as that illustrated in FIGURE 2, this is equivalent to a displacement of the entire figure to the right or left without causing any significant change in the shape of the curve for small displacements.

In addition to balancing the phase or relative position of the B—H curves, means are also provided for further balancing the magnetic characteristics of the two cores by selectively adjusting the relative magnitude of the E.M.F.'s generated by the cores 10 and 11. As shown in FIGURE 3, carrier windings 14 and 15 are connected in series and across a source of carrier current (not shown). A balancing potentiometer 34 is also connected across the source of carrier current with the variable tap connected to the common terminal connection between the windings 14 and 15. Hence, balance potentiometer 34 in the carrier circuit serves to by-pass a portion of the carrier energy from the windings, with the ratio being controlled by the position of the variable tap. Selective adjustment of the potentiometer permits the magnitude of the net carrier currents applied to carrier windings 14 and 15 to be independently established so as to compensate for differences in the magnetic characteristics of the cores themselves. In terms of the B—H curves for the cores 10 and 11 this is equivalent to making a scale factor adjustment accomplished by either widening or narrowing the B—H curve without causing any significant displacement either right or left.

As shown, a buffer choke 35 is connected to the input winding 12 and serves to isolate the signal source from the input winding. It will be apparent that means, such as choke 35, need not be utilized where the signal source has a high impedance. For this reason such devices have not been illustrated or described in conjunction with the other input or feedback windings.

In applications where a pair of cores, such as cores 10 and 11, are required it is common practice to select from a multiplicity of cores, two of which have very similar magnetic characteristics. In practice, however, it is almost impossible to obtain two cores which are exactly alike. Differences invariably exist and it is the purpose of the aforedescribed balancing means to compensate for these slight dissimilarities which cannot be realized by selection of the cores alone. As will be apparent hereinafter, it may not be necessary or desirable to balance the E.M.F.'s developed by the cores over the entire cycle but it may be desired to balance the cores only over a portion of the E.M.F. cycle. However, in either event substantial improvement in sensitivity, as well as accuracy, can be readily realized by utilizing means for balancing out the small magnetic dissimilarities remaining in the cores even after careful selection.

It will be apparent that the null detector illustrated in FIGURE 3 differs from that shown and described in FIGURE 1 in that it includes both phase and magnitude balancing which serves to compensate for magnetic dissimilarities that cannot be satisfied by core selection alone. FIGURE 3 further differs from FIGURE 1 in that it provides means for indicating the relative magnitude of two unidirectional signals, one of which is applied to winding 12 and the other to winding 25. However, the net current flowing in windings 12 and 25 act in much the same manner as the single input signal illustrated in FIGURE 1. An output signal is developed across the output winding which will correspond to the polarity of the net input signal. The sensitivity of the circuit in the vicinity of the null will be greatly improved, of course, as the result of the aforedescribed core balancing.

FIGURE 4 illustrates a magnetic null detector with means for selecting a predetermined portion of the output signal and rejecting the undesired components. The null detector may be similar to those described hereinbefore and may include the magnetic cores 10 and 11, the pair of input windings 12 and 25 and the output winding 13, which are each carried by both of the cores, and the pair of carrier windings 14 and 15 carried separately by the cores 10 and 11 respectively. Operation of the null detector is similar to that described hereinbefore, however, as the ultimate resolution of the magnetic circuit is approached, the voltage pulse appearing on the output winding 13 no longer appears as simply a positive or negative pulse. Although the output voltage appears as a complex waveform which cannot be described as simply positive or negative, it has been found that a particular portion of the complete cycle of this complex voltage waveform will have a polarity which is sensitive to the polarity of the net input signal applied to windings 12 and 25.

Means for selecting the desired portion of the output voltage waveform and rejecting the undesired components may be provided in the form of a synchronous detector comprising a gating circuit 36 and means for selectively opening the gate at a predetermined time to allow the desired portion of the waveform to pass through the gate. The particular form of gating circuit 36 forms no part of the present invention. Any one of the conventional "AND" gates commonly used in pulse systems will suffice. As shown gate 36 has a pair of input terminals 37 and 38 and a single output terminal 39, which may be connected to an indicator or other circuitry as desired. Terminal 37 is connected through an amplifier 42 to the output winding 13 carried by the two magnetic cores 10 and 11. Gate 36 is connected to means for generating a voltage pulse for opening the gate for a predetermined duration during each cycle of the output voltage waveform. As shown, terminal 38 is connected to the output of a univibrator 43, the input of which is connected to a source of timing pulses developed by the source of carrier current 44 and appropriate synchronizing circuits 45.

The source of carrier current 44 is connected across carrier windings 14 and 15, and with D.C. currents being applied to input windings 12 and 25, an output voltage is developed in winding 13 each cycle of the carrier current. As mentioned hereinbefore, carrier current source 44 may be a generator for producing a sine wave, a sawtooth wave or a pulse wave output. The output of source 44 is applied to the pulse shaping and synchronizing circuits 45 which serve to actuate the one-shot multivibrator 43 at a predetermined time during the output waveform cycle whereupon the multivibrator applies a pulse over terminal 38 which opens gate 36 and allows the output voltage waveform to pass through during the duration of the pulse. When the univibrator switches back to its original stable state, the gate is turned off and subsequent components of the output signal are blocked from output terminal 39.

It will be apparent that the carrier source serves as the time reference and where the carrier current is a sine wave, synchronizing circuit 45 may be a simple peaking circuit followed by a conventional time delay circuit. Where the carrier source has a sawtooth or pulse waveform, equally well known circuits will be readily apparent to one skilled in the art for developing the required pulse and variable time delay for actuating the univibrator.

Assuming that the desired portion of the whole period of the output waveform is 2 microseconds in duration and the leading edge of this portion occurs 10 microseconds after time is equal to zero, the univibrator is then designed to produce a single pulse with a 2 microsecond duration. The reference signal produced by the carrier is shaped where necessary to actuate univibrator 45 and a 10 microsecond delay is introduced. Hence, the univibrator is turned on for a period of 2 microseconds at a time 10 microseconds after $t=0$ as established by the carrier source. Operation may be better understood by referring to FIGURE 6, which illustrates one complete period of the E.M.F.'s generated by the cores 10 and 11. Between the two arrows 46 and 47 is the desired predetermined portion of the output signal which has been chosen for purposes of illustration to be 2 microseconds in duration. In the above illustration, with time plotted along the arrow 47, the length of arrow 47 would be 10 microseconds. Thus, it may be seen that when the ultimate resolution of a particular null detector is approached a small portion of the complex output waveform having a polarity which is sensitive to the polarity of the net input signal may be selected and all other components rejected. It has been found that the use of the aforedescribed circuitry materially increases the sensitivity of a given magnetic null detector.

FIGURE 6 also serves to illustrate and further clarify the effect of balancing the magnitude and phase of the E.M.F.'s generated by the cores 10 and 11 as described in detail in connection with FIGURE 3. The solid line 48 may be considered as representing the E.M.F. generated by the core 10 and the dotted line the E.M.F. generated by core 11. As shown, there is a slight phase displacement between the waveforms 48 and 49 and a slight difference in magnitude. It will be noted that the unbalanced E.M.F.'s are quite similar. The rather close matching of the two E.M.F.'s may be considered to represent the effect of selecting cores for similar magnetic characteristics as mentioned hereinbefore. Balancing of the two magnitudes is accomplished by adjusting the compensating potentiometer 34 which causes the net carrier currents applied to windings 15 and 16 to be slightly different to compensate for the differences in the cores themselves. Adjustment of potentiometer 33 causes different currents to flow through windings 26 and 27. This balance control differs from the scale factor adjustment in that a phase displacement is introduced between the two E.M.F. curves 48 and 49. However, even using these two means of compensation, the B—H curves generally cannot be matched completely. Since a particular portion of the complex output voltage waveform developed when the ultimate resolution of the null detector is approached does have a polarity which is sensitive to the polarity of the net input signal, substantial improvement in sensitivity is realized by more exact balancing over only that particular portion of the B—H curves which is indicated in the drawings as being between the arrows 46 and 47. This portion of the E.M.F. cycles generated by the cores is selected through the operation of the normally closed gate 36 and the means synchronized with the carrier current for opening the gate during the balanced portion of the output voltage waveform.

FIGURE 5 illustrates a magnetic null detector which utilizes a pair of cores compensated to produce similar electromotive forces over a portion of the output cycle and gating means for selecting that portion of the cycle to control a digital current source that supplies current to the feedback winding of the magnetic circuit. The null detector is similar to that described hereinbefore and includes the pair of cores 10 and 11, input winding 12, reference or feedback winding 25, output winding 13 and the pair of carrier windings 14 and 15. The E.M.F.'s generated by the cores are both magnitude and phase balanced over a portion of the output waveform as described in detail in connection with FIGURES 3 and 6. The sensitivity of the system is further improved by selecting only the balanced portion of the output voltage waveform, as described in detail in connection with FIGURES 4 and 6, which is allowed to pass through gate 36 and actuate a digital current source 55. The digital current source 55 supplies current over lead 56 to the feedback winding 25 of the magnetic null detector wherein the current applied from an unknown source to input winding 12 is compared with the digitized current output from the digital current source 55. In this manner the input current is measured indirectly by determining the feedback current in winding 25 which will exactly match the magneto-motive force due to the signal current flowing in winding 12. Devices such as the digital current source 55 are well known, they are commercially available and are commonly used in commercial instruments such as the Datrac, manufactured by Epsco, Inc., of Cambridge, Massachusetts. A more detailed explanation of the typical digital current source may be found in my co-pending application Serial No. 652,969, filed April 15, 1957, and entitled "Magnetic Commutator and Measuring Apparatus," now Patent No. 2,978,694.

In operation, the digital current source 55 is servoed to a null by the information pulses which are allowed to pass through gate 36. The polarity of the pulse applied to the digital current source is sensitive to the polarity net input signal applied to input winding 12 and feedback winding 25. The digital current source is an iterative device which is automatically programmed to produce on output terminal 56 one-half of full scale current for one cycle. If this current, which is applied to feedback winding 25, is inadequate to match the signal current in winding 12, as indicated by the polarity of the signal allowed to pass through gate 36, the current of one-half is allowed to continue to flow. The digital current source 55 then generates a second current having a value of one-quarter full scale which is added to the previous current value of one-half. The magnitude of this feedback current is then compared with the input current applied to winding 12 whereupon the magnetic null detector generates a signal having a polarity corresponding to the relative magnitude of the input and feedback signals. The interrogation process is carried on in binary or binary-coded decimal form until the digital current source 55 is generating a current which matches the signal input current through winding 12 to within the desired accuracy.

The absolute accuracy of null detection systems, where a feedback signal is used to accurately match an input signal, is limited by the minimum resolution of the null detector with respect to noise and drift. It will, therefore, be apparent that the absolute accuracy of the system illustrated in FIGURE 5 will be substantially increased over prior systems as a result of the improvements described above.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A magnetic null detector comprising a pair of magnetic cores formed of magnetic material having high maximum differential permeability, an input winding and an output winding carried by both of said cores, a separate carrier winding carried by each of said cores, means for applying a direct current signal to said input winding, a source of carrier current, means for applying said carrier current simultaneously to each of said carrier windings to generate in said output winding a voltage signal which varies at the fundamental frequency of said carrier current and has a predetermined output signal portion having a polarity corresponding to the polarity of said direct current signal, and synchronous detector means synchronized with said carrier current and connected to said output winding for selecting said predetermined output signal portion to derive a direct current output therefrom of either polarity selectively in accordance with the polarity of said input signal.

2. A magnetic null detector comprising a pair of magnetic cores formed of magnetic material having high maximum differential permeability, an input winding, an output winding and a reference winding carried by both of said cores, an individual carrier winding carried by each of said cores, means for applying a first direct current signal to said input winding, means for applying a second direct current signal to said reference winding, a source of carrier current, means for applying said carrier current to each of said carrier windings to generate in said output winding a voltage signal which varies at the fundamental frequency of said carrier current and has a predetermined output signal portion having a polarity corresponding to the relative magnitude of said first and second signals, and synchronous detector means synchronized with said carrier current and connected to said output winding for selecting said predetermined output signal portion to derive a direct current output therefrom of either polarity selectively in accordance with the polarity of said input signal.

3. A magnetic null detector comprising a pair of magnetic cores formed of magnetic material having high maximum differential permeability, an input winding and an output winding carried by both of said cores, a separate carrier winding carried by each of said cores, means for applying a direct current signal to said input winding, a source of carrier current connected to said carrier windings to generate in said output winding a voltage waveform which varies at the fundamental frequency of said carrier current and has a predetermined waveform portion indicative of the polarity of said signal, balancing means for applying different magnitudes of carrier current to each of said carrier windings to balance the relative magnitude of the electromotive forces generated by said cores, and synchronous detector means synchronized with said carrier current and connected to said output winding for selecting said predetermined waveform portion to derive a direct current output therefrom of either polarity selectively in accordance with the polarity of said input signal.

4. A magnetic null detector comprising a pair of magnetic cores formed of magnetic material having high maximum differential permeability, an input winding and an output winding carried by both of said cores, a separate carrier winding carried by each of said cores, means for applying a direct current signal to said input winding, a source of carrier current, means for applying said carrier current to each of said carrier windings to generate in said output winding a voltage signal which varies at the fundamental frequency of said carrier current and has a predetermined output signal portion having a polarity corresponding to the polarity of said input signal, direct current balancing means applied to said cores for adjusting the phase of the electromotive forces generated by said cores upon application of said carrier current, and synchronous detector means synchronized with said carrier current and connected to said output winding for selecting said predetermined output signal portion to derive a direct current output therefrom of either polarity selectively in accordance with the polarity of said input signal.

5. A magnetic null detector comprising a pair of magnetic cores formed of magnetic material having high maximum differential permeability, an input winding and an output winding carried by both of said cores, a separate carrier winding carried by each of said cores, means for applying a direct current signal to said input winding, a source of carrier current connected to said carrier windings to generate in said output winding a voltage waveform which varies at the fundamental frequency of said carrier current and has a predetermined waveform portion indicative of the polarity of said signal, means for applying different magnitudes of carrier current to said carrier windings to balance the amplitude of the electromotive forces generated by said cores over said predetermined portion of said waveform, a gate connected in circuit with said output winding, and circuit means synchronized with said carrier current for opening said gate during the predetermined portion of said waveform and allowing that portion of said waveform to pass through said gate.

6. A magnetic null detector comprising a pair of magnetic cores formed of magnetic material having high maximum differential permeability, an input winding and an output winding carried by both of said cores, a separate carrier winding carried by each of said cores, means for applying a direct current signal to said input winding, a source of carrier current connected to said carrier windings to generate in said output winding a voltage waveform which varies at the fundamental frequency of said carrier current and has a predetermined waveform portion indicative of the polarity of said signal, direct current balancing means applied to each of said cores for adjusting the phase of the electromotive forces generated by said cores over said predetermined portion of said waveform, a gate connected in circuit with said output winding, and circuit means synchronized with said carrier current for opening said gate during the predetermined portion of said waveform and allowing that portion of said waveform to pass through said gate.

7. A magnetic null detector comprising a pair of magnetic cores formed of magnetic material having high maximum differential permeability, an input winding and an output winding carried by both of said cores, a separate carrier winding carried by each of said cores, a gate connected in circuit with said output winding, means for applying a direct current signal to said input winding, a source of carrier current applied to said carrier windings to produce an output signal in said output winding which varies at the fundamental frequency of said carrier current and has a predetermined output signal portion of polarity corresponding to that of said direct current, a source of triggering signals synchronized with said carrier current, and a selection circuit interconnected between said source of triggering signals and said gate and including means for generating a voltage pulse for opening said gate for a predetermined duration during each cycle of said output signal corresponding to said output signal portion thereby allowing that portion of said output signal to pass through said gate.

8. A magnetic null detector comprising a pair of magnetic cores formed of magnetic material having high maximum differential permeability, an input winding, an output winding and a reference winding carried by both of said cores, an individual carrier winding carried by each of said cores, means for applying a first signal to said input winding, means for applying a second signal to said reference winding, a source of carrier current, means for applying said carrier current to each of said carrier windings to generate in said output winding a current having a polarity corresponding to the relative magnitudes of said first and second signal, a gate connected in circuit with said output winding, a source of triggering signals synchronized with said carrier current, and a selection circuit interconnected between said source of triggering signals and said gate and including means for generating a voltage pulse for opening said gate for a predetermined duration during each cycle of said output signal and thereby allowing that portion of said output signal to pass through said gate.

9. A magnetic null detector comprising a pair of magnetic cores formed of magnetic material having high maximum differential permeability, an input winding, an output winding and a reference winding carried by both of said cores, an individual carrier winding carried by each of said cores, means for applying a first direct current signal to said input winding, means for applying a second direct current signal to said reference winding, a source of carrier current applied to each of said carrier windings to generate in said output winding a voltage waveform which varies at the fundamental frequency of said carrier current and has a predetermined waveform portion indicative of which of said first and second signals is larger, means for adjusting the relative magnitude of carrier current to balance the amplitude of the electromotive forces generated by said cores over said predetermined portion of the waveform, direct current balancing means applied to each of said cores for balancing the phase of the electromotive forces generated by said cores over said same predetermined portion of the waveform, a gate connected in circuit with said output winding and with said second signal applying means, and circuit means synchronized with said carrier current for opening said gate during said predetermined portion of said voltage waveform and allowing that portion of the waveform to pass through said gate to actuate said second signal applying means to thereby apply said second signal to the reference winding.

10. A magnetic null detector comprising a pair of magnetic cores formed of magnetic material having high maximum differential permeability, an input winding, an output winding and a reference winding carried by both of said cores, an individual carrier winding carried by each of said cores, means for applying a first direct current signal to said input winding, means for applying a second direct current signal to said reference winding, a source of carrier current applied to each of said carrier windings to generate in said output winding a voltage output signal which varies at the fundamental frequency of said carrier current and has a predetermined output signal portion of polarity indicative of which of said first and second signals is larger, means for adjusting the relative amplitude of carrier current applied to said carrier windings to compensate for differences in the magnitude of the electromotive forces generated by said cores, direct current balancing means applied to each of said cores for adjusting the phase of the electromotive forces generated by said cores, a gate connected in circuit with said output winding and with said second signal applying means, a source of triggering signals synchronized with said carrier current, and a selection circuit interconnected between said source of triggering signals and said gate for generating a voltage pulse for opening said gate for a predetermined duration during each cycle of said output signal corresponding to said predetermined output signal portion thereby allowing that portion of said output signal to pass through said gate to actuate said second signal applying means to apply said second direct current signal to the reference winding.

11. A magnetic null detector comprising a pair of magnetic cores formed of magnetic material having high maximum differential permeability, an input winding, an output winding and a reference winding carried by both of said cores, an individual carrier winding carried by each of said cores, means for applying a first direct current signal to said input winding, a digital current source for supplying a second direct current signal to said reference winding, a source of carrier current, means for applying said carrier current to each of said carrier windings to generate in said output winding a voltage waveform which varies at the fundamental frequency of said carrier current and has a predetermined waveform portion having a polarity corresponding to the algebraic sum of said first and second signals, a gate circuit interconnected between said output winding and said digital current source, and means synchronized with said carrier current for opening said gate for a portion of the period of said voltage waveform corresponding to said predetermined waveform portion thereby allowing that portion of said waveform to pass through said gate to actuate said digital current source.

12. A magnetic null detector comprising a pair of magnetic cores formed of magnetic material having high maximum differential permeability, an input winding, an output winding and a feedback winding carried by both of said cores, an individual carrier winding carried by each of said cores, means for applying a first direct current signal to said input winding, a digital current source connected to said feedback winding for supplying a second direct current signal to said feedback winding, a source of carrier current, means for applying said carrier current to each of said carrier windings to generate in said output winding a voltage waveform which varies at the fundamental frequency of said carrier current and has a predetermined waveform portion having a polarity corresponding to the algebraic sum of said first and second signals, means for adjusting the relative magnitude of carrier current to balance the amplitude of electromotive forces generated by said cores over said predetermined portion of the waveform, direct current balancing means applied to each of said cores for balancing the phase of the electromotive forces generated by said cores over said predetermined portion of the waveform, a gate circuit interconnected between said output winding and said digital current source, and means synchronized with said carrier current for opening said gate during said predetermined portion of said voltage waveform and allowing that portion of said waveform to pass through said gate to actuate said digital current source and thereby apply said second direct current signal to said feedback winding.

13. A magnetic null detector comprising a pair of matched cores formed of magnetic material having high maximum differential permeability, input circuit means responsive to direct current input and feedback signals received thereby and magnetically coupled to both of said cores for subtracting fluxes therein due respectively to said input and feedback signals to provide a net flux in said cores, output circuit means magnetically coupled to both of said cores, cyclically energized interrogation circuit means separately coupled magnetically to each of said cores for inducing a complex output voltage waveform in said output circuit means when said net flux has a value other than zero, said waveform varying cyclically at the fundamental frequency of said interrogation circuit means and comprising a direct current portion having a polarity corresponding to the polarity of the net signal input, and means included in said output circuit means for selecting and applying said direct current portion to said input circuit means as said feedback signal.

14. A null detector as in claim 13, said input circuit means comprising a pair of windings each wound on both of said cores for respectively receiving said input and feedback signals.

15. A null detector as in claim 13, said output circuit means comprising an output winding wound on both of said cores, said interrogation circuit means comprising a cyclically varying source of energy and a pair of carrier windings wound respectively on said cores and each energized from said source, and said selecting means comprising an amplifier connected to said output winding and gated by said source of energy.

16. A magnetic null detector comprising a pair of matched cores formed of magnetic material having high maximum differential permeability, input, feedback, and output windings each wound on both of said cores, a pair of carrier windings wound respectively on said cores, circuit means comprising a cyclically varying source of energy for separately energizing said carrier windings, said source including a direct current component for magnetically biasing said cores, said carrier windings inducing equal and opposite voltage waveforms in said output winding which cancel therein when said cores are perfectly matched, said circuit means including means for selectively varying the relative amplitude of energization of said carrier windings from said source to tend to bring a predetermined portion of said waveforms into balance to thereby compensate for certain imperfections in the matching of said cores, compensating circuit means magnetically coupled to said cores for adjusting the phase of said waveforms to tend to bring said predetermined portion thereof into balance to compensate for certain other imperfections in the matching of said cores, said input and feedback windings responsive to input and feedback signals respectively therein producing fluxes which subtract in said cores to provide a net flux which unbalances said predetermined portion of said waveforms to produce an output signal having a polarity corresponding to the polarity of the net signal input to said input and feedback windings, and means connected to said output winding and gated by said energy source for selecting and applying said output signal as said feedback signal to said feedback winding.

References Cited in the file of this patent
UNITED STATES PATENTS

| | | |
|---|---|---|
| 2,574,438 | Rossi et al. | Nov. 6, 1951 |
| 2,633,557 | Cabes | Mar. 31, 1953 |
| 2,666,151 | Rajchman et al. | Jan. 12, 1954 |
| 2,676,253 | Ayres | Apr. 20, 1954 |
| 2,696,347 | Lo | Dec. 7, 1954 |
| 2,700,759 | Ogle et al. | Jan. 25, 1955 |
| 2,725,549 | Dunnet | Nov. 29, 1955 |
| 2,745,090 | Grillo | May 8, 1956 |
| 2,770,738 | Vance | Nov. 13, 1956 |
| 2,809,302 | Lawrence | Oct. 8, 1957 |
| 2,809,353 | Brown | Oct. 8, 1957 |
| 2,828,477 | Lanning | Mar. 25, 1958 |
| 2,834,893 | Spencer | May 13, 1958 |